United States Patent
Ramsey et al.

(10) Patent No.: US 6,907,004 B1
(45) Date of Patent: Jun. 14, 2005

(54) METHOD AND SYSTEM FOR MANUAL ADMISSION CONTROL WITH USER OPTIONS

(75) Inventors: Bradley C. Ramsey, Carrollton, TX (US); Kenneth P. Pruski, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 712 days.

(21) Appl. No.: 09/703,424

(22) Filed: Oct. 31, 2000

(51) Int. Cl.[7] ................................................. H04J 1/16
(52) U.S. Cl. .................... 370/235; 370/352; 370/468
(58) Field of Search ........................... 370/229–230, 370/235, 237, 248, 252, 352–356, 389, 400, 468, 395.52, 465, 238, 236, 395.2, 395.32, 395.21, 420, 466; 709/228–229, 239, 250; 379/93.09, 213.01, 158, 202, 112.08, 114.07; 455/401

(56) References Cited

U.S. PATENT DOCUMENTS

| | | | | |
|---|---|---|---|---|
| 5,675,577 A | * | 10/1997 | Komatsu | 370/237 |
| 6,157,648 A | | 12/2000 | Voit et al. | 370/401 |
| 6,324,280 B2 | * | 11/2001 | Dunn et al. | 379/230 |
| 6,330,316 B1 | * | 12/2001 | Donak et al. | 379/196 |
| 6,452,922 B1 | * | 9/2002 | Ho | 370/352 |
| 6,490,274 B1 | | 12/2002 | Kim | 370/352 |
| 6,493,445 B2 | | 12/2002 | Garland et al. | 379/243 |
| 6,515,964 B1 | * | 2/2003 | Cheung et al. | 370/230 |
| 6,574,216 B1 | * | 6/2003 | Farris et al. | 370/352 |
| 6,590,867 B1 | * | 7/2003 | Ash et al. | 370/236 |
| 6,600,735 B1 | * | 7/2003 | Iwama et al. | 370/352 |
| 6,625,119 B1 | | 9/2003 | Schuster et al. | 370/230 |
| 6,628,666 B1 | * | 9/2003 | Pickering et al. | 370/468 |
| 6,636,508 B1 | | 10/2003 | Li et al. | 370/389 |
| 6,690,651 B1 | * | 2/2004 | Lamarque et al. | 370/252 |
| 6,751,270 B1 | * | 6/2004 | Choi et al. | 375/326 |

* cited by examiner

Primary Examiner—Frank Duong
Assistant Examiner—Melanie Jagannathan
(74) Attorney, Agent, or Firm—Baker Botts L.L.P.

(57) ABSTRACT

A call manager receives a call setup request for a Voice over Internet Protocol (VoP) call from a phone having an associated call originator. The call manager then determines whether sufficient bandwidth exists for the VoP call over a link using a bandwidth table. If insufficient bandwidth exists on the link for the VoP call, the call manager presents a plurality of call completion options to the call originator. One of the call completion options is a public switched telephone network (PSTN) option. In response to the selection of the PSTN option, the call manager routes the VoP call over a PSTN.

68 Claims, 3 Drawing Sheets

FIG. 2

| FIRST LOCATION | SECOND LOCATION | MAX BANDWIDTH (kbits) | AVAILABLE BANDWIDTH (kbits) |
|---|---|---|---|
| A | B | 128 | 64 |
| A | C | 10,000 | 9256 |
| B | C | 10,128 | 9320 |

FIG. 3

| ORIGINATION LOCATION | DESTINATION LOCATION | SESSION ID | ORIGINATION NUMBER | DESTINATION NUMBER | PSTN TRANSLATION | STATUS | BANDWIDTH USED/CODEC (kbits) |
|---|---|---|---|---|---|---|---|
| A | B | 26 | 5001 | 5002 | 972-813-5002 | 1 | G.711 |
| A | C | 29 | 5003 | 1004 | 702-555-1004 | 2 | 40 |
| B | C | 31 | 1004 | 5001 | 972-813-5001 | 3 | PSTN |
| A | B | 35 | 5002 | 5004 | 972-813-5004 | HOLD | G.711 |

METHOD AND SYSTEM FOR MANUAL ADMISSION CONTROL WITH USER OPTIONS

TECHNICAL FIELD OF THE INVENTION

This invention relates in general to telecommunications, and more specifically to a method and system for manual admission control with user options.

BACKGROUND OF THE INVENTION

As computers have grown increasingly important in today's society, more and more existing products are using computer technology. One industry that has embraced computer technology is the telecommunications industry. In particular, Voice over Packet (VoP) systems allow the advantages of packet-based communication techniques to be recognized in the historically circuit-switched voice phone systems. VoP phone systems are also gaining in popularity as upgrades and replacements for Private Branch Exchange (PBX) phone systems.

SUMMARY OF THE INVENTION

The present invention addresses the problems and disadvantages associated with prior systems. In particular, the present invention provides a method and system for call admission control with user options.

One aspect of the present invention involves a method comprising receiving a call setup request associated with a voice over packet (VoP) call between an origination and a destination. The method further comprises determining whether bandwidth is available on a communication link between the origination and the destination, and presenting at least one call completion option for a call originator associated with the call setup request when bandwidth is not available.

Another aspect of the present invention involves a phone comprising a memory, an application stored in the memory and a processor coupled to the memory. The processor, when executing the application, is operable to receive a call denial message. The call denial message indicates that insufficient bandwidth exists to complete a phone call originated by a call originator. The processor, when executing the application, is further operable to determine at least one call completion option to communicate to the call originator and to communicate the call completion option to the call originator.

A further aspect of the present invention involves a method comprising initiating a Voice over Packet (VoP) call using a call setup request from an origination to a destination and receiving a rejection of the VoP call at the origination. The method further involves displaying a call completion option at the origination in response to the rejection, and receiving the selection of the call completion option by a user associated with the origination.

Yet another aspect of the present invention involves a system comprising a means for initiating a Voice over Packet (VoP) call using a call setup request from an origination to a destination and a means for receiving a rejection of the VoP call at the origination. The system further comprises a means for displaying a call completion option at the origination in response to the rejection, and a means for receiving the selection of the call completion option by a user associated with the origination.

Another aspect of the present invention involves a method comprising receiving a call setup request associated with a voice over packet (VoP) call between an origination and a destination at a first call manager and determining whether bandwidth is available on a first communications link. The method further comprises communicating the call setup request to a second call manager coupled to the first call manager using a second communications link, determining whether bandwidth is available on the second communication link at the second call manager, and determining at least one call completion option at the first call manager for a call originator associated with the origination when bandwidth is not available on either of the first and second communications links.

The present invention provides a number of technical advantages. Various aspects of the invention may include all, some or none of these advantages. One such technical advantage is the capability to provide call options to a call originator when insufficient bandwidth exists for a Voice over Packet (VoP) phone call. In one embodiment, the voice apparatus presents the call originator with an option to route the phone call over the public switched telephone network (PSTN). The call originator may also wait on hold or be rung-back when sufficient bandwidth becomes available. The call options provide increased flexibility to businesses using VoP systems. Call options may be presented based on the call originator. For example, a business may allow the CEO to make long-distance PSTN calls while restricting interns to the cheaper VoP system. Further, a priority may be associated with a VoP call and used to determine which call options to present. Also, the call options may be presented using programmable keys associated with a VoP phone. Other technical advantages are readily apparent to one skilled in the art from the following figures, descriptions, and claims.

BRIEF DESCRIPTION OF THE DRAWINGS

A better understanding of the present invention will be realized from the detailed description that follows, taken in conjunction with the accompanying drawings, in which:

FIG. 2 is a chart illustrating details of a bandwidth table used by the communication system;

FIG. 3 is a chart illustrating details of a call status table used by the communication system;

DETAILED DESCRIPTION OF THE INVENTION

Figure 1:
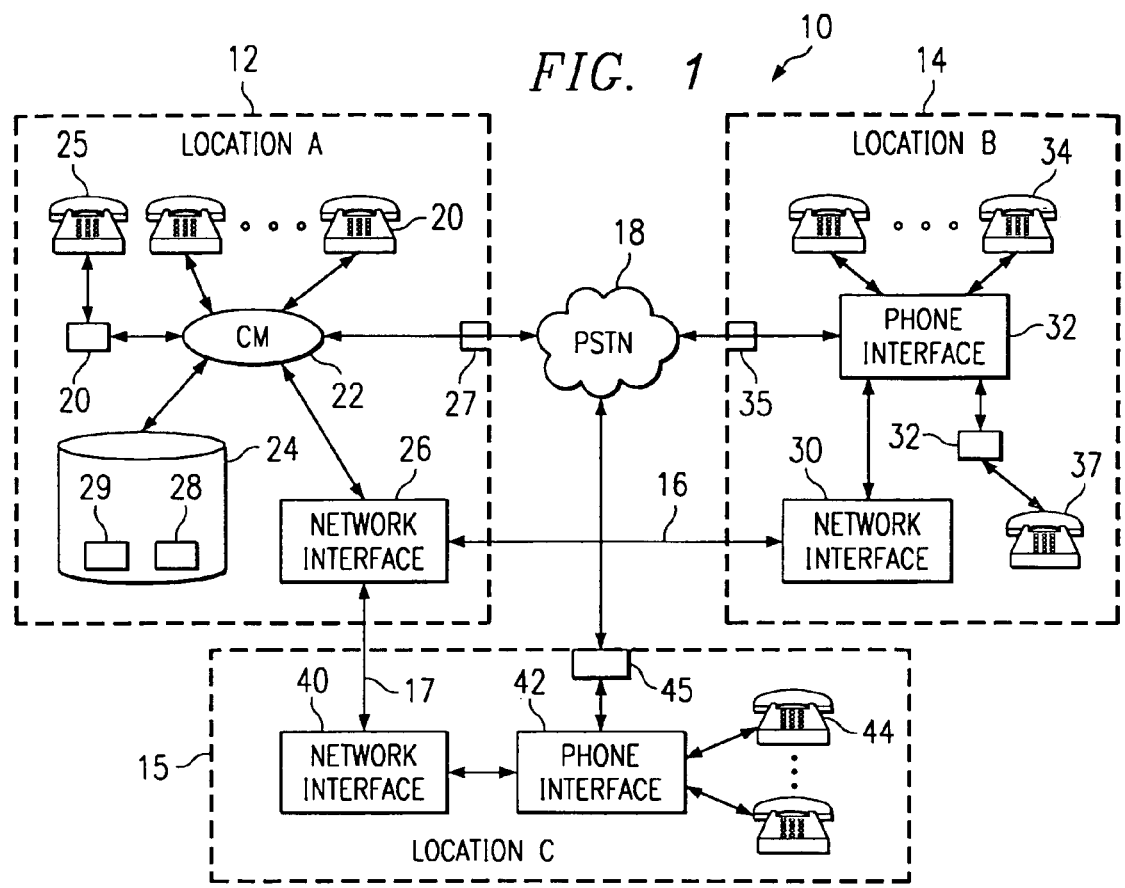
FIG. 1 is a block diagram of a communication system constructed in accordance with the present invention.

FIG. 1 is a block diagram illustrating a phone system 10 using a packet-based phone system such as the Voice over Packet (VoP) system. In general, system 10 provides the option to a user of a VoP phone to complete a VoP call using the PSTN when the VoP call can not be completed, for example, due to insufficient bandwidth being available.

A first location 12 comprises a plurality of phones 20, a call manager 22, a computer readable storage device 24, a network interface 26 and a PSTN gateway 27. First location 12 uses call manager 22 to manage communication between first location 12 and a second location 14 which use VoP. First location 12 is defined as a hub location by the presence of call manager 22.

Phones 20 are VoP telephones coupled to call manager 22 which convert spoken audio into packet form for communication using VoP techniques. Phones 20 may also be gateways coupled to one or more analog phones to provide VoP capabilities to standard analog phones 25. In general, phones 20 include any suitable packet-based voice phone call devices that can communicate audio information in packets, cells, messages, or other suitable information formats. Phones 20 may include a Cisco IP Phone 7960.

Storage device 24 is any suitable computer readable storage device, such as magnetic storage, optical storage, persistent and transient memory such as Dynamic Random Access Memory (DRAM) and Static Ram (SRAM), and other suitable storage devices and technologies. Storage device 24 stores a bandwidth table 28 and a call status table 29. Table 28 includes information regarding the maximum bandwidth and currently available bandwidth over links 16 and is described in more detail in association with FIG. 2. Table 29 includes information regarding calls managed by call manager 22 and is described in more detail in association with FIG. 3. Tables 28 and 29 can be separate, combined, local, remote or have any other suitable organization.

Network interface 26 is a hardware and/or software data interface that communicates data between call manager 22 and communications links 16 and 17. For example, network interface 26 may be an Ethernet interface, a digital modem, an analog modem, a digital subscriber line (DSL), a basic rate interface (BRI) for an integrated services digital network (ISDN), an asynchronous transfer modem (ATM) interface or other suitable local area network (LAN), metropolitan area network (MAN), and wide area network (WAN) interfaces or any other suitable interface for communicating data. In the disclosed embodiment, network interface 26 may comprise a Cisco DT-24.

Call manager 22 is hardware and/or software that receives packetized voice data from phones 20. Call manager 22 may also communicate the packetized voice data over communications links 16 and 17 using network interface 26 and the VoP protocol. Call manager 22 is further capable of controlling the establishment and tear down of phone calls using the VoP protocol. In the disclosed embodiment, call manager 22 may be a Cisco 7830 Media Convergence Server.

PSTN gateway 27 routes communications originating or terminating at phones 20 over PSTN 18 using plain old telephone service (POTS) and converts packetized voice data to a traditional analog representation for use over PSTN 18. In general, gateway 27 may use any non-packet based network, such as a circuit-switched analog or digital network. PSTN gateway 27 is controlled by call manager 22.

Second location 14 includes a network interface 30, a phone interface 32, a plurality of VoP phones 34, and a gateway 35. Network interface 30 is software and/or hardware operable to receive data from phone interface 32 and communicate data over communications link 16. For example, network interface 30 may be similar to network interface 26.

Phone interface 32 is an interface for receiving digitized voice data from VoP phones 34 and communicating that data over network interface 30 and/or PSTN 18. Phone interface 32 communicates VoP data to network interface 30. Phone interface 32 may form a portion of phone 34 or may be separate from phone 34. Gateway 35 converts VoP encoded data from phones 34 to an analog representation for use with PSTN 18.

VoP phones 34 are hardware and/or software operable to receive spoken audio and convert the spoken audio into a packetized form for communication using the VoP protocol. VoP phone 34 may also be a gateway coupled to a traditional analog phone 37 and to receive spoken audio from the analog phone 37 and convert the spoken audio into a packetized form for communication using the VoP protocol. VoP phones 34 may each include a respective phone interface 32 or may be coupled to a central interface 32.

A communications link 16 is a data communication system operable to communicate information between network interfaces 26 and 30. For example, communications link 16 may be any combination of an analog modem link, an Ethernet link, an ATM link, a frame-relay link, an integrated services digital network (ISDN) link, a digital subscriber line (DSL) link, a cable modem link, a wireless link, and other suitable wireless or wireline data communications systems. Communications link 16 may be one or more physical or logical connections. For example, link 16 may be multiple ISDN lines linking locations 12 and 14. Communications link 17 is a data communication system operable to communicate information between network interfaces 26 and 40. For example, communications link 17 may be similar to communications link 16.

A PSTN 18 is a public switched telephone network providing plain old telephone service (POTS). PSTN 18 may also be a cell phone or a satellite communications network. In general, PSTN 18 may be any suitable wireless or wireline based voice and/or data communications system. PSTN 18 may also represent multiple networks, such as a cell phone network coupled to a wireline telephone network.

A third location 15 includes a network interface 40, a phone interface 42, a plurality of VoP phones 44, and a gateway 45. Network interface 40 is software and/or hardware operable to receive data from phone interface 32 and communicate data over communications link 17. For example, network interface 40 may be similar to network interface 26.

Phone interface 42 is an interface for receiving digitized voice data from VoP phones 44 and communicating that data over network interface 40 and/or PSTN 18. Phone interface 42 may be similar to interface 32. VoP phones 44 are hardware and/or software operable to receive spoken audio and convert the spoken audio into a packetized form for communication using the VoP protocol, similar to VoP phones 34.

In operation, phone 34 initiates a VoP call to a phone 20. Alternatively, a phone 20 may initiate a call to phone 34. Call manager 22 then determines whether sufficient bandwidth is available over communications link 16 to handle a VoP call between phones 20 and 34. More specifically, call manager 22 consults table 28 to determine the maximum available bandwidth and currently available bandwidth on link 16. Alternatively, call manager 22 may directly determine the available bandwidth on link 16 using any suitable method. If sufficient bandwidth exists on link 16 to support a VoP call between phones 20 and 34 then call manager 22 enters the call on table 29. Call manager 22 then establishes the call between phones 20 and 34 so that the users associated with phones 20 and 34 may communicate.

If insufficient bandwidth exists on link 16, then call manager 22 provides one or more call completion options to a call originator. The call originator is a human user or electronic device which initiated the call. The call completion options may be provided to the call originator by phone 20 associated with the call originator, or by call manager 22. In one embodiment, call manager 22 communicates a call denial message to phone 20 associated with the call originator indicating that insufficient bandwidth exists and the phone 20 provides the call options. In another embodiment, call manager 22 provides the call options to phone 20 for communication to the call originator. In general, the intelligence for handling the call completion options may be provided by call manager 22 and/or phone 20.

The call options include abandoning the call and establishing the call over PSTN 18. Another call option is waiting on hold for sufficient bandwidth to become available, and/or having call manager 22 automatically ring back the call originator at the originating phone 20 when sufficient bandwidth is available and then automatically establishing the call connection. The options are presented to the user through an interactive voice response (IVR) system and/or using a display associated with phones 20 and 34 and described in more detail in association with FIG. 5. The user then selects one of the options and call manager 22 acts in response to the selected option.

Which call options to present to the call originator may be determined based on any suitable criteria. For example, call manager 22 may determine whether to present the PSTN option based on whether the call is a local or a long distance call, such as when a company decides to allow local calls to be carried over the PSTN but not long distance calls because of the additional cost. The criteria may also take into account a priority associated with the call and/or the identity of the call originator. For example, a high priority call from the chairman of a company may always be presented with the PSTN option, while a low priority call from an intern may not receive the PSTN option.

FIG. 2 is a chart illustrating details of table 28. Generally, table 28 contains information regarding bandwidth usage between voice devices served throughout system 10. Each entry in chart 28 includes a first location 50, a second location 52, a maximum bandwidth indication 54, and an available bandwidth indication 56. In a particular embodiment, first location 50 includes an indication of the location of call manager 22, and second location 52 includes an indication of one or more phones 34 managed by call manager 22 and accessible using one or more links 16 and/or 17. Maximum bandwidth 54 is an indication of the maximum total amount of data that may be transferred over link 16, link 17 or links 16 and 17, per unit time. In one embodiment, maximum bandwidth 54 is expressed in units of kilobits per second, but any other suitable representation may be used. Available bandwidth indication 56 is an indication of the available amount of data per unit time that may be transferred over communications link 16 and/or 17. More specifically, while maximum bandwidth 54 indicates the total amount of bandwidth available for use, available bandwidth 56 indicates the currently unused portion of the maximum bandwidth 54. In one embodiment, currently available bandwidth 56 is expressed in units of kilobits per second, but any suitable representation may be used.

A first exemplary entry 58 in table 28 indicates that link 16 between location A and location B has a maximum bandwidth of 128 kilobits per second (such as when communications link 16 of FIG. 1 is an ISDN line) and a currently available bandwidth of 64 kilobits per second. The currently available bandwidth 56 indicates that half of the maximum available bandwidth is being used, such as for a VoP call, and that one-half is available to be used. A second entry 60 indicates that link 17 between location A to location C has a maximum available bandwidth of 10,000 kilobits per second (10 megabits per second) and that 9,256 kilobits per second (9.265 megabits per second) is currently available. A third entry 62 indicates that links 16 and 17 between location A and location C, and location A and location B have a total maximum available bandwidth of 10,128 kilobits per second and that 9320 kilobits per second is currently available. Table 28 is used by call manager 22 to determine whether sufficient bandwidth exists for a VoP call over communications links 16 and 17. For example, if a VoP call requires 96 kilobits per second of bandwidth, then a call from A to B would fail because, as indicated in entry 58, only 64 kilobits per second of bandwidth is currently available.

Call manager 22 updates table 28 to reflect additional calls. Call manager 22 also synchronizes tables 28 and 29 so that bandwidth used by calls listed in table 29 is reflected in available bandwidth 58. Tables 28 and 29 may be integral to call manager 22 or separate from call manager 22. It should also be noted that tables 28 and 29 represent one exemplary method for tracking information by call manager 22, other methods may be used within the scope of the invention.

Call manager 22 is also capable of accounting for the failure of all or portions of links 16 and 17. For example, the first entry in table 28 indicates that 128 kilobits per second is the maximum available bandwidth. If the 128 kilobits per second was available over two ISDN lines, each providing 64 kilobits per second of the 128 kilobits per second, and one of the lines failed, call manager 22 would receive a notification of the failure and update the appropriate maximum available bandwidth indicator 54. More specifically, an alert or interrupt may be received from interface 26 and inform call manager 22 of a failure in a portion of link 16. Call manager 22 may then update the appropriate indicator 54 and decrease the maximum amount of bandwidth until the failure at link 16 is repaired. Call manager 22 may also drop phone calls over link 16 in order to allow other phone calls to continue given the decreased bandwidth. Call manager 22 may further decrease the quality of the VoP phone call in order to preserve as many phone calls as possible over link 16, such as by changing the compression scheme. Call manager 22 may additionally move some calls over link 16 to PSTN 18 in order to allow calls to continue. In general, call manager 22 may take any suitable action in response to a loss of bandwidth over links 16 and/or 17.

FIG. 3 is a chart illustrating details of table 29. Table 29 includes a call origination location 100, a call destination location 102, a session identifier 104, a call origination number 106, a call destination number 108, a PSTN translation 110, a status 112 and a bandwidth used or encoder/decoder (CODEC) indicator 114. Call origination location 100 is a numeric, alphanumeric or other indicator of a location, such as location A in FIG. 1, where a VoP call is originated from. Call destination location 102 is a numeric, alphanumeric or other indication of the location of the destination of the call, such as location B in FIG. 1. Session identifier 104 is a numeric, alphanumeric or other identifier used to identify a particular call and distinguish a particular call from other calls that may be simultaneously occurring. In the disclosed embodiment, session IDs 104 for presently active calls are each unique.

Call origination number 106 is an indication of the extension and/or phone which originated the call. In one embodiment, origination number 106 is a numeric indication of the extension which originated the call. Call destination number 108 is an indication of the number of the destination phone. Destination number 108 may be an indication of the extension and/or phone at the destination location 102 which is being called from call origination number 106. Destination number 108 may also be a complete phone number called by the call originator or any other suitable address. In the United States, the complete phone number is a ten digit number with area code, prefix and number. Outside of the U.S., a complete phone number may be in other formats. In one embodiment, call manager 22 performs the translation between destination number 108 and PSTN translation 110 by consulting a look-up table (not shown) which maps extensions to complete numbers. PSTN translation 110 is a translation performed by call manager 22 to convert the number dialed as the destination number 108 into the complete phone number for contacting the far end phone using VoP or PSTN as appropriate. PSTN translation 110 allows for the routing of a call over PSTN 18 by call manager 22. Call destination number 108 and PSTN translation 110 may comprise the same entry such as when the call originator dials a complete number.

Status 112 indicates the status of a call and the priority level of the call. In one embodiment, a priority is indicated by a numeric value, such as one, two or three, while a status is indicated by a string, such as "hold" or "ringback". Status 112 is an indication of the importance of a call and may be used to determine the amount of bandwidth allocated to the call, whether the call may be degraded in order to allow other calls to go through, and other decisions. Status 112 may range from one to five with one being the highest priority and five being the lowest priority, but any number of priority levels may be used. Status 112 also tracks the status of the call, such as on hold or ring back.

Bandwidth used/CODEC indication 114 is an indication of the amount of bandwidth used by a call or the CODEC used by the call for encoding the VoP traffic. The digital representation of voice data used by VoP protocols allows for the compression of that information to decrease the amount of bandwidth used by the voice data. Various compression schemes are used with VoP data and represent various tradeoffs between bandwidth usage, voice quality and other factors. For example, a large decrease in data size or high level of data compression may be achieved at the expense of decreased sound quality of the voice data. Similarly, a small decrease in data size or low level of data compression may allow for high sound quality of the voice data. The CODEC represents the particular type of compression routine used with the VoP data. For example, VoP data may be compressed using the G.711, G.722, G.723.1, G.726, G.727, G.728, G.729 or G.729 annex A CODECs. Each compression scheme represents a particular combination of sound quality, level of compression, compression delay and other factors.

For example, the first entry in table 29 indicates an origination location 100 of location A and a destination location 102 of location B. Locations 100 and 102 indicate the general location of the originator and destination of the call as opposed to a particular phone 20 or 34. In general, locations 100 and 102 indicate any suitable location that can identify one or a series of links 16 to complete the VoP call. Session ID 104 of 26 is a unique identifier for identifying the call associated with the first entry in table 29 from other ongoing calls listed in table 29. Origination number 106 indicates an extension of 5001, which may be associated with one of the phones 20 at location A, and destination number 108 indicates an extension of 5002, which may be associated with a phone 34 at location B. If the person who originated the call chooses to have call manager 22 place the call over PSTN 18, PSTN translation 110 of 972-813-5002 indicates the complete phone number to be dialed by call manager 22 in order to connect phone 20 with phone 34 over PSTN 18 either directly or using a gateway associated with or service the phone. Status 112 of one may indicate a high priority call. Bandwidth used/CODEC indication 114 indicates that VoP CODEC G.711 is being used for this particular call.

For another example, the second entry in table 29 indicates a call from location A to location C. This entry indicates that the destination number 108 is extension 1004 and PSTN translation 110 shows that extension 1004 has an area code and prefix different from the area code and prefix of the first entry in table 29. This example illustrates that destination number 108 may be an extension in an office in another city or state or country, and that PSTN translation 110 is not restricted to any particular area code or prefix. This allows system 10 to be used with locations, such as 15, in different cities, states, or countries. The second entry also illustrates a status 112 of two. The fourth entry in table 29 shows a call with a status 112 of "hold." Status 112 will change from "hold" when the call is established to the priority level associated with the call. Other techniques for tracking on hold and ring back calls may be used. The status of two in the second entry may indicate a lower priority call than the call in the first entry. The bandwidth used is 40 kilobits per second in indication 114. This illustrates that, if, for example, a non-standard CODEC or encoding scheme is being used to communicate the call associated with the second entry in table 29 may be indicated by the amount of bandwidth used as opposed to the actual CODEC.

For further example, the third entry in table 29 indicates an origination location 100 of B and destination location 102 of C. Referring back to FIG. 1, location C may be third location 15 which is similar to second location 14 to location A. Location A would continue to be the hub location for both locations B and C. Thus, the third entry in table 29 illustrates a call from a remote location to a remote location instead of a call between first location 12 and second location 14. Indication 114 indicates that PSTN 18 is being used for the call between B and C in the third entry. Since the call between location B and location C is over PSTN 18, no bandwidth is used over links 16 and 17.

Figure 4:
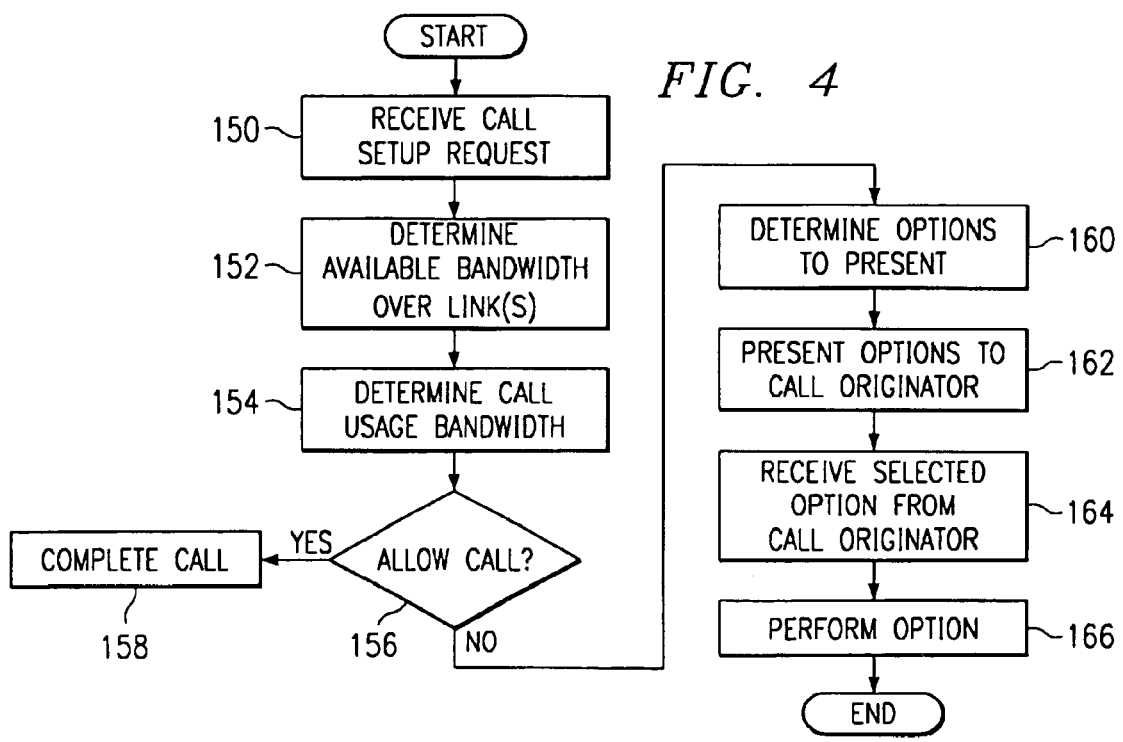
FIG. 4 is a flow chart of a method for providing options to a user when bandwidth is unavailable to complete a voice call using the communication system.

FIG. 4 is a flow chart illustrating a method for providing options to a user when insufficient bandwidth is available to complete a VoP call. The method begins at step 150, where a call setup request is received by call manager 22, for example, phone. The call setup request is one or more data packets indicating to call manager 22 that phone 20 is requesting the establishment of a connection between phones 20 and 34. Call manager 22 determines the available bandwidth over one or a series of links 16 at step 152. Call manager 22 may determine the currently available bandwidth over links 16 by consulting table 28 for the originating location and the destination location. As link 16 may represent multiple physical or logical data communication paths, call manager 22 may see multiple possible data paths over link 16. Call manager 22 decides which possible data path to use based on any suitable criteria. For example, call manager 22 may choose the data path having the smallest number of nodes between the originator of the call and the destination of the call. For another example, call manager 22 may choose the data path having the lowest latency or end-to-end delay. In general, call manager 22 may use any suitable criteria to determine which data path to use over link 16.

Then, at step 154, call manager 22 determines the amount of bandwidth required for the call requested in step 150. The amount of bandwidth needed for the call may be determined based on the compression and/or encoding scheme to be used for the call, the status 112 of the call, the existence of video data with the call, the identity of the call originator, the types of links 16 available, and any other suitable information.

Call manager 22 determines whether to allow the call at step 156. Call manager 22 determines whether to allow the call based on the amount of bandwidth available over one or a series of links 16 and the bandwidth needed by the call. If the available bandwidth is greater than the bandwidth needed by the call, then the call is completed using VoP at step 158.

If the amount of bandwidth needed by the call is greater than the currently available bandwidth, call manager 22 determines which options to present to the user at step 160. The options to present to the user may vary based on the status 112 of the call, the identity of the user, phone 20 from which the call is originating, the location of phone 34 which is being called, and other information. For example, a high priority call from the chairman of the company may be presented with the option to use PSTN 18 to complete the call, while a low priority call from an intern is only presented the options of on hold, ring back and abandoning the call. In general, the call options to present may be determined using any criteria.

The options are presented to the call originator at step 162. The options may be presented using an Interactive Voice Response (IVR) system, a visual display associated with phone 20, programmable soft keys, or a combination of these methods or by other suitable techniques. Call manager 22 receives the selected option from the call originator at step 164, and initiates the option selected by the user at step 166. For example, if the user has selected to have the call routed over PSTN 18, then gateway 27 will convert VoP data from phones 20 to an analog representation for use over PSTN 18 and gateway 35 convert VoP data from phones 34 to the analog representation used by PSTN 18. If the user selects to wait on hold or be rung back when the call is completed, call manager 22 stores the call information in table 29 and monitors table 28 to determine when sufficient bandwidth is available over link 16 for the call to go forward.

Figure 5:
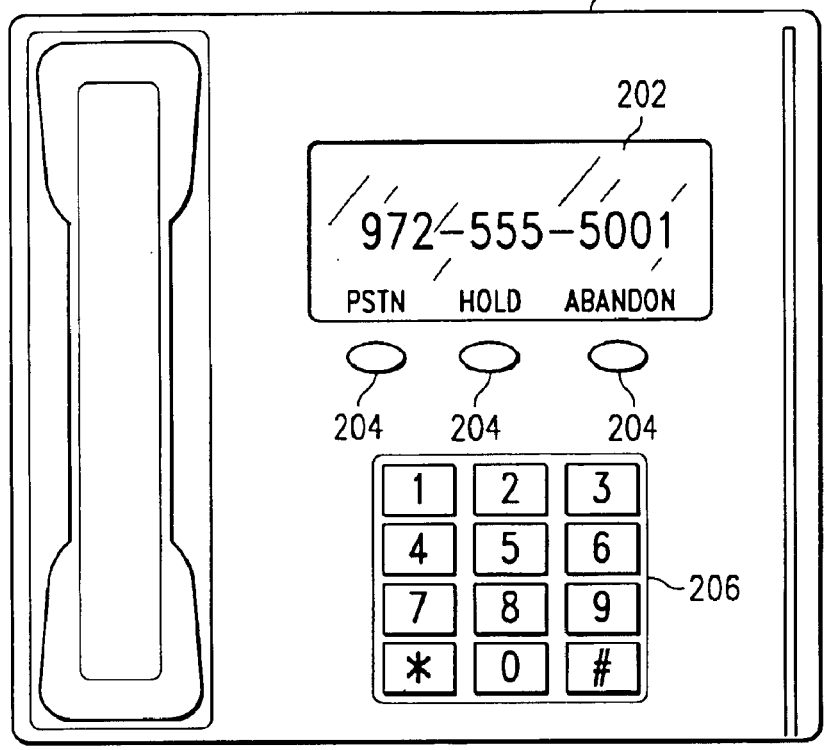
FIG. 5 is a diagram of one embodiment of a phone used in the communication system.

FIG. 5 is a diagram illustrating one embodiment of phones 20 and 34. A phone 200 includes a phone 20 having a display 202, one or more programmable keys 204, and a keypad 206. Display 202 is an alphanumeric display operable to output visual information to the user. Display 202 may be a liquid crystal display (LCD). Display 202 responds to commands from call manager 22 and/or phone interface 32. Programmable keys 204 are buttons or keys whose behavior is configurable. More specifically, an option may be dynamically associated with each programmable key 204 by call manager 22 or interface 32. Keypad 206 is a standard numeric keypad for use with a telephone.

In operation, programmable keys 204 and display 202 may be used to present options to a call originator using the phone whose call has been disallowed by call manager 22, such as in step 156 of FIG. 4. In response to call manager 22 not admitting the call due to insufficient bandwidth, various options may be associated with programmable keys 204 and displayed on display 202 for selection by the user. For example, a first option may be associated with a first one of the programmable keys 204 to allow the user to route the user's call over PSTN 18 or some alternative network. A second option may be associated with a second one of the programmable keys 204 to allow the user to wait on hold until sufficient bandwidth exists for the user's call to be completed. A third option may be associated with a third one of the programmable keys 204 to allow the user to abandon the user's call. A fourth option may be associated with a fourth one of the programmable keys 204 to allow the user to be rung back and the call completed when sufficient bandwidth exists for the call. The ring back option allows the user to hang up the phone, the phone will then ring the user and complete the call when sufficient bandwidth exists. The ring back option operates similarly to the on hold option, except that the user is allowed to hang up the phone and will be alerted when the call can be completed. In general, any suitable options may be presented to the user using programmable keys 204 on display 202.

Figure 6:
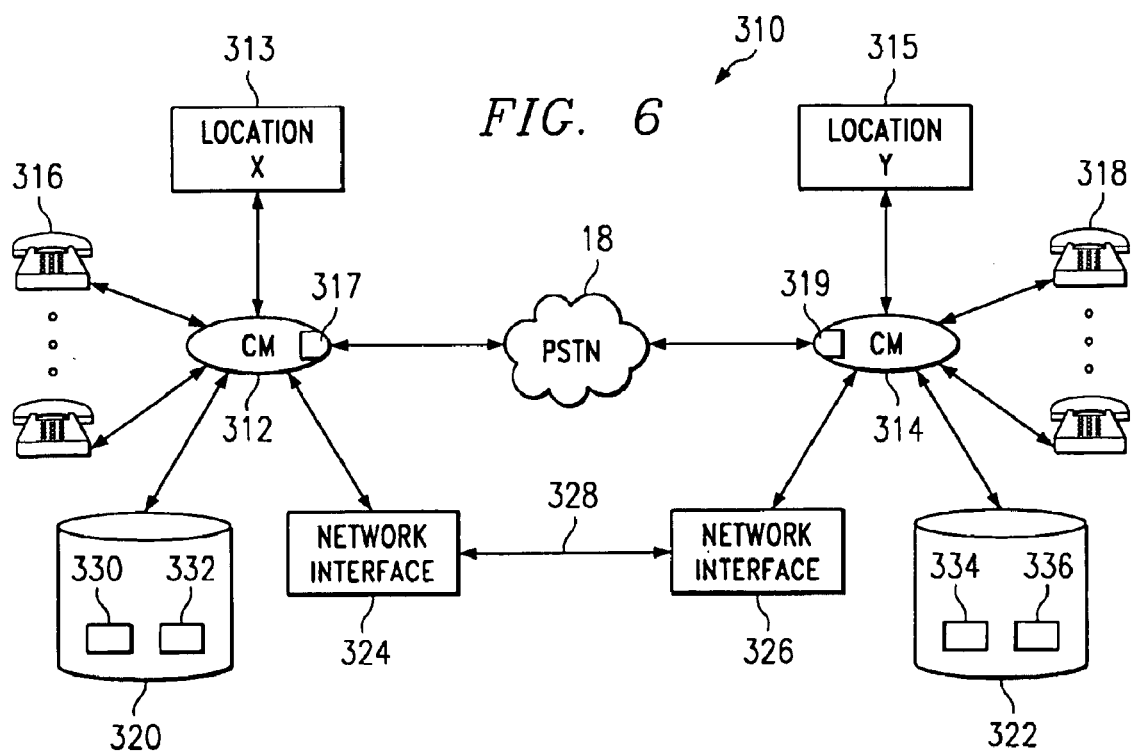
FIG. 6 is a block diagram of a multiple call manager embodiment of the communication system.

FIG. 6 is a block diagram illustrating system 310 with more than one call manager. System 310 includes a first call manager 312, a second call manager 314, a first set of phones 316, a second set of phones 318, a first storage device 320, a second storage device 322, a first network interface 324 and a second network interface 326.

First call manager 312 is hardware and/or software for receiving packetized voice data from phones 316 and controlling the establishment and tear down of phone calls between phones 316 and other phones using the VoP protocol. A gateway 317 routes communications originating or terminating at phones 316 over PSTN 18 using POTS and to convert packetized voice data from phones 316 to traditional analog representation for use over PSTN 18. Call manager 312 may be further operable to communicate the packetized voice data over communications link 328 using network interface 324 and the VoP protocol.

The first set of phones 316 are VoP telephones coupled to call manager 312 which convert spoken audio into packet form for communication using VoP. Storage device 320 is any suitable computer readable storage device, such as magnetic storage, optical storage, persistent and transient memories, and other suitable storage devices and technologies. Storage 320 stores a first bandwidth table 330 and a first call status table 332. Table 330 includes information regarding the maximum bandwidth and currently available bandwidth over link 328, similar to table 28 described in FIG. 2. Table 332 includes information regarding calls managed by first call manager 312, similar to table 29 described in FIG. 3. Network interface 324 is a software and/or hardware interface that communicates- data between call manager 312 and communications link 328, similar to network interface 26.

Second call manager 314 is hardware and/or software that receives packetized voice data from phones 318. Second call manager 314 may also communicate the packetized voice data over communications link 328 using network interface 326 and the VoP protocol. Call manager 314 further controls the establishment and tear down of phone calls using the VoP protocol. A gateway 319 routes communications originating or terminating in phones 318 over PSTN 18 using POTS and converts packetized voice data from phones 318 to a traditional analog representation for use over PSTN 18.

The second set of phones 318 are VoP telephones coupled to call manager 314 and operable to convert spoken audio into a packetized form for communication using the VoP protocol, similar to phones 34. Storage device 320 is any suitable computer readable storage device, such as magnetic storage, optical storage, persistent and transient memory, and other suitable storage devices and technologies. Storage device 322 stores a second bandwidth table 334 and a second call status table 336. Table 334 includes information regarding maximum bandwidth and currently available bandwidth over link 328, similar to table 28 described in FIG. 2. Table 336 includes information regarding calls currently managed by call manager 314, similar to table described in FIG. 3.

Network interface 326 is a hardware and/or software interface that communicates data between call manager 314 and communications link 328. Communications links 328 are a data communication system operable to communicate information between network interfaces 324 and 326, similar to communications link 16 described in FIG. 1. Communications link 328 may comprise one or more physical or logical connections.

In operation, tables 330 and 334 are synchronized at predetermined intervals between call managers 312 and 314 in order to maintain up-to-date and consistent information about the currently available bandwidth on link 328. In contrast, tables 332 and 336 may not be synchronized between call managers 312 and 314 as call managers 312 and 314 may independently manage calls. Alternatively, tables 332 and 336 may be synchronized between call managers 312 and 314.

Phone 316 initiates a VoP call to phone 318. Call manager 312 then determines whether sufficient bandwidth is available over communications link 328 to handle the VoP call between phones 316 and 318. More specifically, call manager 312 consults table 330 to determine the maximum available bandwidth and currently available bandwidth on link 328. If sufficient bandwidth is available on link 328 to support a VoP call between phones 316 and 318, then call manager 312 enters the call on table 332. Call manager 312 then sends a request to call manager 314.

Call manager 314 then consults table 334 to determine if sufficient bandwidth is available over communications link 328 to handle the VoP call between phones 316 and 318. Call manager 314 may determine that insufficient bandwidth exists on link 328. For example, call manager 314 may have just established another VoP call over link 328 and not yet synchronized tables 330 and 334. Thus, tables 330 and 334 may be reporting different amounts of available bandwidth on link 328. Call manager 314 does not allow the call to be established and communicates the disallowance to call manager 312.

In response to the disallowance by call manager 314, call manager 312 removes the call from table 332 and presents the call options to the call originator at phone 316. The user then selects one of the call options and call manager 312 acts in response to the selected option. Which option to present to the call originator may be determined based on any suitable criteria, such as the criteria used by call manager 22 in determining which of the call options to present.

Call managers 312 and 314 may independently manage calls which originate from their respective phones. More specifically, call manager 312 manages calls originating from phones 316 and phones at remote location 313, while call manager 314 manages calls from phones 318 and phones at remote location 315. Call managers 312 and 314 share information in tables 330 and 334 regarding link 328 in order to maintain up-to-date information regarding currently available bandwidth at link 328. Call managers 312 and 314 may route calls over PSTN 18 when link 328 contains insufficient bandwidth.

It should be recognized that other changes, substitutions and alterations are also possible without departing from the spirit and scope of the present invention, as defined by the following claims.

What is claimed is:

1. A method comprising:
receiving a call setup request associated with a voice over packet (VoP) call between an origination and a destination;
prior to establishing the VoP call, determining whether bandwidth is available on a communication link between the origination and the destination;
presenting at least one call completion option for a call originator associated with the call setup request when bandwidth is not available, the at least one call completion option comprising a hold option to hold for a connection between the origination and the destination pending bandwidth availability; and
upon receiving a selection of the hold option from the call originator:
storing the call setup request in response to the selection of the hold option;
determining when bandwidth is available; and
establishing a connection between the origination and the destination when the bandwidth is available.

2. The method according to claim 1, wherein the at least one call completion option comprises an alternate network option and further comprising:
receiving a selection of the alternate network option; and
establishing a connection between the origination and the destination using a public switched telephone network in response to the selection of the alternate network option by the call originator.

3. The method according to claim 2, wherein establishing the connection using a public switched telephone network comprises establishing the connection between the origination and the destination through a gateway coupled to the public switched telephone network.

4. The method according to claim 1, wherein the at least one call completion option comprises a ring back option and further comprising, upon receiving a selection of the ring back option from the call originator:
storing the call setup request in response to the selection of the ring back option;
disconnecting with the call originator;
determining when the bandwidth is available;
establishing a connection between the origination and the destination; and
alerting the call originator that the VoP call will proceed.

5. The method according to claim 1, and further comprising:
determining available bandwidth on a link to complete the VoP call; and
reducing available bandwidth by the bandwidth used to complete the VoP call.

6. The method according to claim 5, and further comprising updating a call status table in response to completing the VoP call, the call status table comprising a status indication and the status indication comprising an indication of the status of the VoP call.

7. The method according to claim 1, wherein presenting the at least one call completion option comprises presenting the at least one call completion option using an interactive voice response system.

8. The method according to claim 1, wherein presenting the at least one call completion option comprises presenting the at least one call completion option using at least one programmable key associated with a phone.

9. The method according to claim 1, wherein determining the amount of available bandwidth comprises consulting a bandwidth table, the bandwidth table comprising a first location, a second location, a maximum bandwidth indication and an available bandwidth indication.

10. The method according to claim 1, wherein the origination and the destination respectively comprise devices that communicate audio information using data packets.

11. A phone comprising:
a memory;
an application stored in the memory,
a processor coupled to the memory, the processor, when executing the application, operable to:
receive a call denial message from a call manager coupled to the phone, the call denial message indicating that insufficient bandwidth exists to establish a phone call originated by a call originator;
determine at least one call completion option to communicate to the call originator, the at least one call completion option comprising a hold option to hold for a connection between the phone and a destination pending bandwidth availability;
communicate the at least one call completion option to the call originator; and
upon receiving a selection of the hold option from the call originator:
communicate the selection of the hold option to the call manager; and
establish a connection between the phone and the destination upon receiving an indication from the call manager that bandwidth is available.

12. The phone according to claim 11, wherein the at least one call completion option comprises an alternate network option and, the processor, when executing the application, is further operable to:
receive a selection of the alternate network option; and
establish a connection between the phone and the a destination using a public switched telephone network in response to the selection of the alternate network option by the call originator.

13. The phone according to claim 11, wherein the determination of the at least one call completion option to communicate to the call originator is based on a status associated with the call originator.

14. A method comprising:
initiating a Voice over Packet (VoP) call using a call setup request from an origination to a destination;
receiving a rejection of the establishment of the VoP call at the origination;
displaying at least one call completion option at the origination in response to the rejection of the establishment of the VoP call, the at least one call completion option comprising a hold option to hold for a connection between the origination and the destination pending bandwidth availability; and
upon receiving a selection of the hold option from a user associated with the origination:
communicate the selection of the hold option: and
establish a connection between the origination and the destination upon receiving an indication that bandwidth is available.

15. The method according to claim 14, wherein the at least one call completion option comprises an alternate network option and further comprising establishing a connection between the origination and the destination using a public switched telephone network in response to the selection of the alternate network option by the call originator.

16. The method according to claim 14, wherein displaying the at least one call completion option comprises programming a programmable key associated with the origination.

17. A system comprising:
means for initiating a Voice over Packet (VoP) call using a call setup request from an origination to a destination;
means for receiving a rejection of the establishment of the VoP call at the origination;
means for displaying at least one a call completion option at the origination in response to the rejection of the establishment of the VoP call, the at least one call completion option comprising a hold option to hold for a connection between the origination and the destination pending bandwidth availability; and
means for, upon receiving a selection of the hold option from a user associated with the origination:
communicating the selection of the hold option; and
establishing a connection between the origination and the destination upon receiving an indication that bandwidth is available.

18. The system according to claim 17, wherein the at least one call completion option comprises an alternate network option and further comprising means for establishing a connection between the origination and the destination using a public switched telephone network in response to the selection of the alternate network option by the call originator.

19. The system according to claim 17, wherein the means for displaying the at least one call completion option comprises means for programming a programmable key associated with the origination.

20. A method comprising:
receiving a call setup request associated with a voice over packet (VoP) call between an origination and a destination at a first call manager;
determining whether bandwidth is available on a first communications link;
communicating the call setup request to a second call manager coupled to the first call manager using a second communications link;
determining whether bandwidth is available on the second communication link at the second call manager;
determining at least one call completion option at the first call manager for a call originator associated with the origination when bandwidth is not available on either of the first and second communications links, the at least one call completion option comprising a hold option to hold for a connection between the origination and the destination pending bandwidth availability on either of the first and second communication links; and
upon receiving a selection of the hold option from the call originator:
storing the call setup request in response to the selection of the hold option;
determining when bandwidth is available on either of the first and second communication links; and
establishing a connection between the origination and the destination when the bandwidth is available.

21. The method according to claim 20, wherein the at least one call completion option comprises an alternate network option and further comprising:
receiving a selection of the alternate network option at the first call manager; and
establishing a connection between the origination and the destination using a public switched telephone network in response to the selection of the alternate network option by the call originator.

22. The method according to claim 21, wherein establishing the connection using a public switched telephone network comprises establishing the connection between the origination and the destination through a gateway coupled to the public switched telephone network.

23. The method according to claim 20, wherein the at least one call completion option comprises a ring back option and further comprising, upon receiving a selection of the ring back option at the first call manager from the call originator:
storing the call setup request in response to the selection of the ring back option at the first call manager;
disconnecting with the call originator;
determining when the bandwidth is available on the first and second communication links;
establishing a connection between the origination and the destination using the first and second communication links; and
alerting the call originator that the call will proceed.

24. The method according to claim 20, and further comprising updating a first call status table at the first call manager in response to completing the VoP call, the first call status table comprising a first status indication associated with the VoP call originating from the originator coupled to the first call manager, and the first status indication comprising an indication of the status of the VoP call originating from the originator coupled to the first call manager.

25. The method according to claim 24, and further comprising synchronizing the first call status table with a second call status table at the second call manager, the second call status table comprising a second status indication associated with VoP calls originating from a further originator coupled to the second call manager, and the second status indication comprising an indication of the status of a VoP call originating from the further originator coupled to the second call manager.

26. An apparatus comprising:
a memory;
an application stored in the memory;
a processor coupled to the memory, the processor, when executing the application, operable to:

receive a call setup request associated with a voice over packet (VoP) call between an origination and a destination;

prior to the establishment of the VoP call, determine whether bandwidth is available on a communication link between the origination and the destination; and present at least one call completion option for a call originator associated with the call setup request when bandwidth is not available, the at least one call completion option comprising a hold option to hold for a connection between the origination and the destination pending bandwidth availability; and upon receiving a selection of the hold option from the call originator:
store the call setup request in response to the selection of the hold option;
determine when bandwidth is available: and
establish a connection between the origination and the destination when the bandwidth is available.

27. The apparatus according to claim 26, wherein the at least one call completion option comprises an alternate network option and wherein the processor, when executing the application, is further operable to:
receive a selection of the alternate network option; and
establish a connection between the origination and the destination using a public switched telephone network in response to the selection of the alternate network option by the call originator.

28. The apparatus according to claim 27, wherein the processor, when executing the application, is further operable to establish the connection between the origination and the destination through a gateway coupled to the public switched telephone network.

29. The apparatus according to claim 26, wherein the at least one call completion option comprises a ring back option and wherein the processor, when executing the application, is further operable to, upon receiving a selection of the ring back option from the call originator:
store the call setup request in response to the selection of the ring back option;
disconnect with the call originator;
determine when the bandwidth is available;
establish a connection between the origination and the destination; and
alert the call originator that the VoP call will proceed.

30. The apparatus according to claim 26, wherein the processor, when executing the application, is further operable to:
determine available bandwidth on a link to complete the VoP call; and
reduce available bandwidth by the bandwidth used to complete the VoP call.

31. The apparatus according to claim 30, wherein the processor, when executing the application, is further operable to update a call status table in response to completing the VoP call, the call status table comprising a status indication and the status indication comprising an indication of the status of the VoP call.

32. The apparatus according to claim 26, wherein the processor, when executing the application, is further operable to present the at least one call completion option using an interactive voice response system.

33. The apparatus according to claim 26, wherein the processor, when executing the application, is further operable to present the at least one call completion option using at least one programmable key associated with a phone.

34. The apparatus according to claim 26, wherein the processor, when executing the application, is further operable to consult a bandwidth table, the bandwidth table comprising a first location, a second location, a maximum bandwidth indication and an available bandwidth indication.

35. The apparatus according to claim 26, wherein the origination and the destination respectively comprise devices that communicate audio information using data packets.

36. A call manager apparatus comprising:
a memory;
an application stored in the memory;
a processor coupled to the memory, the processor, when executing the application, operable to:
receive a call setup request associated with a voice over packet (VOP) call between an origination and a destination;
prior to the establishment of the VoP call, determine whether bandwidth is available on a communications link;
communicate the call setup request to a remote call manager coupled using a second communications link;
determine at least one call completion option for a call originator associated with the origination when bandwidth is not available on the communications link, the at least one call completion option comprising a hold option to hold for a connection between the origination and the destination pending bandwidth availability on the communications link; and
upon receiving a selection of the hold option from the call originator:
store the call setup request in response to the selection of the hold option;
determining when bandwidth is available on the communications link; and
establish a connection between the origination and the destination when the bandwidth is available.

37. The apparatus according to claim 36, wherein the at least one call completion option comprises an alternate network option and wherein the processor, when executing the application, is further operable to:
receive a selection of the alternate network option; and
establish a connection between the origination and the destination using a public switched telephone network in response to the selection of the alternate network option by the call originator.

38. The apparatus according to claim 37, wherein the processor, when executing the application, is further operable to establish the connection between the origination and the destination through a gateway coupled to the public switched telephone network.

39. The apparatus according to claim 36, wherein the at least one call completion option comprises a ring back option and wherein the processor, when executing the application, is further operable to, upon receiving a selection of the ring back option from the call originator:
store the call setup request in response to the selection of the ring back option;
disconnect with the call originator;
determine when the bandwidth is available on the communication link;
establish a connection between the origination and the destination using the communication link; and
alert the call originator that call will proceed.

40. The method according to claim 36, and wherein the processor, when executing the application, is further operable to update a first call status table in response to completing the VoP call, the first call status table comprising a first status indication associated with the VoP call originating from the originator, and the first status indication comprising an indication of the status of the VoP call originating from the originator.

41. The method according to claim 40, and wherein the processor, when executing the application, is further operable to synchronize the first call status table with a second call status table at the remote call manager, the second call status table comprising a second status indication associated with VoP calls originating from a further originator coupled to the remote call manager, and the second status indication comprising an indication of the status of a VoP call originating from the further originator coupled to the remote call manager.

42. A system comprising:
software embodied in computer readable media and operable to:
receive a call setup request associated with a voice over packet (VoP) call between an origination and a destination;
prior to the establishment of the VoP call, determine whether bandwidth is available on a communication link between the origination and the destination;
present at least one call completion option for a call originator associated with the call setup request when bandwidth is not available, the at least one call completion option comprising a hold option to hold for a connection between the origination and the destination pending bandwidth availability; and
upon receiving a selection of the hold option from the call originator:
store the call setup request in response to the selection of the hold option;
determine when bandwidth is available; and
establish a connection between the origination and the destination when the bandwidth is available.

43. The system according to claim 42, wherein the at least one call completion option comprises an alternate network option and wherein the software is further operable to:
receive a selection of the alternate network option; and
establish a connection between the origination and the destination using a public switched telephone network in response to the selection of the alternate network option by the call originator.

44. The system according to claim 43, wherein establishing the connection using a public switched telephone network comprises establishing the connection between the origination and the destination through a gateway coupled to the public switched telephone network.

45. The system according to claim 42, wherein the call completion option comprises a ring back option and wherein the software is further operable to, upon receiving a selection of the ring back option from the call originator:
store the call setup request in response to the selection of the ring back option;
disconnect with the call originator;
determine when the bandwidth is available;
establish a connection between the origination and the destination; and
alert the call originator that the VoP call will proceed.

46. The system according to claim 42, and wherein the software is further operable to:
determine available bandwidth on a link to complete the VoP call; and
reduce available bandwidth by the bandwidth used to complete the VoP call.

47. The system according to claim 46, and wherein the software is further operable to update a call status table in response to completing the VoP call, the call status table comprising a status indication and the status indication comprising an indication of the status of the VoP call.

48. The system according to claim 42, wherein presenting the at least one call completion option comprises presenting the call completion option using an interactive voice response system.

49. The system according to claim 42, wherein presenting the at least one call completion option comprises presenting the call completion option using at least one programmable key associated with a phone.

50. The system according to claim 42, wherein determining the amount of available bandwidth comprises consulting a bandwidth table, the bandwidth table comprising a first location, a second location, a maximum bandwidth indication and an available bandwidth indication.

51. The system according to claim 42, wherein the origination and the destination respectively comprise devices that communicate audio information using data packets.

52. A method comprising:
receiving a call setup request associated with a voice over packet (VoP) call between an origination and a destination;
prior to establishing the VoP call, determining whether bandwidth is available on a communication link between the origination and the destination;
presenting at least one call completion option for a call originator associated with the call setup request when bandwidth is not available, the at least one call completion option comprising a ring back option; and
upon receiving a selection of the ring back option from the call originator:
storing the call setup request in response to the selection of the ring back option;
disconnecting with the call originator;
determining when the bandwidth is available;
establishing a connection between the origination and the destination; and
alerting the call originator that the VoP call will proceed.

53. The method according to claim 52, wherein the at least one call completion option comprises an alternate network option and further comprising:
receiving a selection of the alternate network option; and
establishing a connection between the origination and the destination using a public switched telephone network in response to the selection of the alternate network option by the call originator.

54. The method according to claim 53, wherein establishing the connection using a public switched telephone network comprises establishing the connection between the origination and the destination through a gateway coupled to the public switched telephone network.

55. The method according to claim 52, wherein the at least one call completion option comprising a hold option to hold for a connection between the origination and the destination pending bandwidth availability and further comprising, upon receiving a selection of the hold option from the call originator:
storing the call setup request in response to the selection of the hold option;
determining when bandwidth is available; and
establishing a connection between the origination and the destination when the bandwidth is available.

56. The method according to claim 52, and further comprising:

determining available bandwidth on a link to complete the VoP call; and reducing available bandwidth by the bandwidth used to complete the VoP call.

57. The method according to claim 56, and further comprising updating a call status table in response to completing the VoP call, the call status table comprising a status indication and the status indication comprising an indication of the status of the VoP call.

58. The method according to claim 52, wherein presenting the at least one call completion option comprises presenting the at least one call completion option using an interactive voice response system.

59. The method according to claim 52, wherein presenting the at least one call completion option comprises presenting the at least one call completion option using at least one programmable key associated with a phone.

60. The method according to claim 52, wherein determining the amount of available bandwidth comprises consulting a bandwidth table, the bandwidth table comprising a first location, a second location, a maximum bandwidth indication and an available bandwidth indication.

61. The method according to claim 52, wherein the origination and the destination respectively comprise devices that communicate audio information using data packets.

62. An apparatus comprising:

a memory;

an application stored in the memory;

a processor coupled to the memory, the processor, when executing the application, operable to:

receive a call setup request associated with a voice over packet (VoP) call between an origination and a destination;

prior to the establishment of the VoP call, determine whether bandwidth is available on a communication link between the origination and the destination; and present at least one call completion option for a call originator associated with the call setup request when bandwidth is not available, the at least one call completion option comprising a ring back option; and upon receiving a selection of the ring back option from the call originator:

store the call setup request in response to the selection of the ring back option;

disconnect with the call originator;

determine when the bandwidth is available;

establish a connection between the origination and the destination; and alert the call originator that the VoP call will proceed.

63. The apparatus according to claim 62, wherein the at least one call completion option comprises an alternate network option and wherein the processor, when executing the application, is further operable to:

receive a selection of the alternate network option; and establish a connection between the origination and the destination using a public switched telephone network in response to the selection of the alternate network option by the call originator.

64. The apparatus according to claim 62, wherein the at least one call completion option comprises a hold option to hold for a connection between the origination and the destination pending bandwidth availability and wherein the processor, when executing the application, is further operable to, upon receiving a selection of the hold option from the call originator:

store the call setup request in response to the selection of the hold option;

determine when bandwidth is available; and establish a connection between the origination and the destination when the bandwidth is available.

65. The apparatus according to claim 62, wherein the processor, when executing the application, is further operable to:

determine available bandwidth on a link to complete the VoP call; and reduce available bandwidth by the bandwidth used to complete the VoP call.

66. The apparatus according to claim 65, wherein the processor, when executing the application, is further operable to update a call status table in response to completing the VoP call, the call status table comprising a status indication and the status indication comprising an indication of the status of the VoP call.

67. The apparatus according to claim 62, wherein the processor, when executing the application, is further operable to present the at least one call completion option using an interactive voice response system.

68. The apparatus according to claim 62, wherein the processor, when executing the application, is further operable to present the at least one call completion option using at least one programmable key associated with a phone.

* * * * *

UNITED STATES PATENT AND TRADEMARK OFFICE
CERTIFICATE OF CORRECTION

PATENT NO. : 6,907,004 B1  
APPLICATION NO. : 09/703424  
DATED : June 14, 2005  
INVENTOR(S) : Ramsey et al.

Page 1 of 1

It is certified that error appears in the above-identified patent and that said Letters Patent is hereby corrected as shown below:

Column 13, Line 36, Claim 17, after "one" delete "a".

Signed and Sealed this

Twenty-first Day of November, 2006

JON W. DUDAS  
*Director of the United States Patent and Trademark Office*